Oct. 30, 1956  G. W. NAGEL  2,769,120
CONTROL CIRCUIT
Filed Oct. 29, 1954

WITNESSES:
E. A. McCloskey.

INVENTOR
George W. Nagel.
BY
Arthur T. Stratton
ATTORNEY

United States Patent Office 2,769,120
Patented Oct. 30, 1956

2,769,120

CONTROL CIRCUIT

George W. Nagel, Forest Hills, Pa., assignor to Westinghouse Electric Corporation, East Pittsburgh, Pa., a corporation of Pennsylvania Application October 29, 1954, Serial No. 465,504

11 Claims. (Cl. 317—130)

My invention relates to a control circuit and, more particularly, to a photo-sensitive control circuit for street lighting service.

At the present time, it is desirable in street lighting systems employing multiple luminaries that the lamps therein are energized in response to decreases in the level of illumination and are deenergized in response to increases in the level of illumination. With such a system, it is obvious that under varying atmospheric conditions, proper illumination of streets and surrounding areas may be achieved automatically without depending upon any human element. Some prior attempts to accomplish these purposes have depended upon utilizing a photo-current from a photoelectric cell in conjunction with a polarized relay, which relays have been quite expensive and which expense has prevented their universal adoption. Other prior attempts have been made to obtain such a control circuit using a non-polar relay, however, in view of the small magnitude of photo-current, thermionic amplifiers have been employed in some instances. Such amplifiers have the disadvantage of requiring periodic replacement and inspection, which has added materially in the maintenance cost of such a system.

Still other prior devices of a similar nature which have utilized polar relays have not been entirely satisfactory, notwithstanding the use of such relays. Primarily, in such control circuits, failure of the photo-sensitive cell or the polar relay has resulted in locking the relay in the position it occupies at the time of the failure which may result in no power being supplied to the lamps. In street lighting systems, it is desirable that such a device "fail safe" that is, upon failure of the components of the circuit including the photosensitive cell, the lights will be energized upon such failure. In this way, the safety of well-lighted streets may be obtained even with a defective device. Still other prior devices which have utilized polar relays have been unsatisfactory and have required a plurality of contacts for line switching purposes which have been an additional initial and maintenance expense.

Accordingly, one object of my invention is to provide a new and improved photo-sensitive control circuit for street lighting purposes which utilizes non-polar relays.

Another object of my invention is to provide a new and improved photo-sensitive control circuit for street lighting purposes which energizes the load upon failure of various component parts of the circuit.

Still another object of my invention is to provide a new and improved photo-sensitive control circuit for street lighting purposes which employs two relays, one of which controls the energization of the other.

A further object of my invention is to provide a new and improved photo-sensitive control circuit for street lighting purposes which is operable from an alternating or direct current source of power.

Yet another object of my invention is to provide a new and improved photo-sensitive control circuit for street lighting purposes which uses a polar relay for controlling the energization of a standard relay.

Yet a more specific object of my invention is to provide a new and improved photo-sensitive control circuit for street lighting purposes which utilizes a polar relay in conjunction with a relay having a movable contact which is continuously energized from a source of electrical energy.

Still another object of my invention is to provide a new and improved photo-sensitive control circuit for street lighting purposes which utilizes a polar relay which does not perform any electrical line switching functions.

Another object of my invention is to provide a new and improved photo-sensitive control circuit for street lighting purposes which employs standard elements having a long maintenance life.

These and other objects of my invention will become more apparent upon consideration of the following detailed description of preferred embodiments of my invention, when taken in conjunction with the attached drawing, in which.

Figure 2:
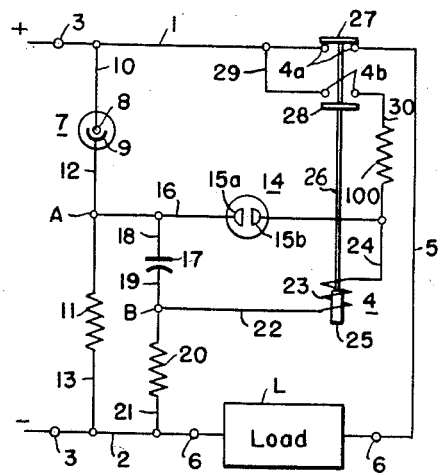
Fig. 2 is a circuit diagram of another embodiment of my invention which employs a non-polar relay.

Referring to Fig. 2, it will be noted that one embodiment of my invention comprises a pair of spaced electrical conductors 1 and 2, each of which may be provided with suitable terminals 3 at one end thereof, whereby conductors 1 and 2 may be suitably connected to the positive and negative sides, respectively, of a suitable source of direct current electrical energy. Conductor 2 is directly connected to one side of an electrical load L, while conductor 1 is connected to one of a pair of spaced electrical contacts 4a, the other of which is connected to the other side of the load L by means of a suitable electrical conductor 5. Load L may be of various types; however, as my invention is more particularly directed to street lighting systems, the load L is preferably one or more standard street lamps of either the incandescent or gaseous discharge type. When contacts 4a are electrically bridged, load L is directly connected across the source of electrical energy and as can readily be appreciated, the particular characteristics of load L are unimportant provided a suitable electrical source is provided for the particular load L to be energized. Also, if desired, for convenience in making electrical connections to the load L, suitable terminals 6 may be supplied at each side of the load L, whereby the conductors 2 and 5 may be secured thereto.

As shown, a photoelectric cell 7, having an anode 8 and a cathode 9, has its anode 8 electrically connected to the positive conductor 1 by means of a suitable electrical conductor 10 and its cathode 9 electrically connected to one side of a resistance 11 by means of a suitable electrical conductor 12. The other side of resistance 11 is electrically connected to the negative conductor 2 by means of a suitable electrical conductor 13. Photocell 7 is of standard construction which is provided with a light-responsive material which emits electrons in proportion to the intensity of light impinging on the cathode thereof, so that an electric current will flow between the anode 8 and the cathode 9. When photocell 7 is conducting, current will flow through conductors 1 and 10, across from the anode 8 to the cathode 9 of photocell 7, through conductor 12, resistance 11, and conductor 13 to the conductor 2. As the photocell 7 is activated in response to light energy, it will be realized that as the emissivity of the cathode 9 increases, the current flowing from the anode 8 to the cathode 9 and through the resistance 11 will also increase.

A suitable discharge device, which may be of the gaseous discharge type, such as a standard neon lamp 14, is employed to obtain a triggering action. Neon lamp 14 comprises a pair of spaced cathodes 15a and 15b of standard and known construction of which cathode 15a is electrically connected to conductor 12 by means of a suitable electrical conductor 16. In order to obtain electrical energy for energizing relay 4, a suitable condenser 17 is electrically connected by an electrical conductor 18, to the conductor 16, and by means of a suitable electrical conductor 19, to one side of a resistance 20. The other side of resistance 20 is electrically connected by means of an electrical conductor 21 to the conductor 2. Condenser 17 is also electrically connected by means of an electrical conductor 22 connected to the conductor 19 to one side of an operating coil 23 of a standard operating relay 4 the other side of which is electrically connected by means of a suitable electrical conductor 24 to the cathode 15b of the neon lamp 14. Thus, it will be noted that the condenser 17 is connected across the cathodes 15a and 15b of the neon lamp 14 by means of the conductors 18 and 16 on one side, and by means of the conductors 19, 22, coil 23 and conductor 24 to cathode 15b on the other side.

The relay 4 is of a type generally available and comprises, in addition to the operating coil 23, a suitable magnetic armature 25 having an upwardly extending arm 26 to which is secured a pair of spaced electrical conducting movable contacts 27 and 28. Contacts 27, 28, 4a and 4b may be formed from any suitable electrical conducting material, and are preferably formed of a suitable contact material such as an arc-resistant silver alloy. Contact 27 is adapted to electrically bridge the stationary contacts 4a previously described when the operating coil 23 of relay 4 is deenergized, while the contact 28 is adapted to electrically bridge a pair of spaced electrical contacts 4b which are similar to the contacts 4a when the operating coil 23 of relay 4 is energized as hereinafter described. As shown, the movable contacts 27 and 28 are located on the arm 26 in any suitable manner, so that when either pair of contacts 4a or 4b are bridged by their respective bridging contact, the other pair of contacts are electrically separated. One of the contacts 4b is electrically connected by means of a suitable electrical conductor 29 to the conductor 1, while the other contact 4b is electrically connected by means of a suitable electrical conductor 30 to conductor 24.

The circuit is shown in Fig. 2 for nighttime operation wherein the load L is electrically energized from the source through the conductor 2 on one side and the conductor 5, bridged contacts 4a and conductor 1 on the other side. Under these nighttime conditions, substantially no current will flow across the photocell 7; however, as morning approaches, the light intensity upon the cathode 9 of photocell 7 gradually increases, which causes a gradual increase in the current flow therethrough and through the resistance 11, as previously discussed.

Referring to the junction of conductors 12 and 16 as point A, it will be appreciated that under nighttime conditions when there is substantially no current flow through resistance 11, there is substantially no voltage drop across resistance 11 and therefore the potential at point A is substantially at the potential of the negative conductor 2. As the current flowing through resistance 11 gradually increases due to the increase of current flowing through photocell 7, as indicated, the voltage drop across resistance 11 increases and, accordingly, the potential of point A gradually becomes more positive with respect to the conductor 2. Inasmuch as the series connected condenser 17 and resistance 20 are connected in parallel with the resistance 11, the potential existing across condenser 17 and resistance 20 is equal to the voltage drop across resistance 11. In view of the fact that the increase in voltage drop across resistance 11 is gradual, resistance 20 will only conduct a small amount of current to charge the condenser 17, and accordingly the potential across condenser 17 will be substantially equal to the voltage drop across resistance 11. Referring to the junction of conductors 19 and 22 as point B, it will be noted that as resistance 20 conducts only a small amount of current, the potential of point B, will be substantially equal to the potential of the negative conductor 2. Point B does not however substantially change its potential with respect to conductor 2 as point A becomes more positive with respect thereto.

As lamp 14 and coil 23 of relay 4 are connected across condenser 17 and as there is no current flow through coil 23 prior to the breakdown of lamp 14, the potential of cathode 15b of lamp 14 is the same as point B, as point B is directly connected thereto by means of conductor 24, coil 23 of relay 4, and conductor 22. The potential of cathode 15a of lamp 14 will gradually increase as the potential existing at point A gradually increases as it is directly connected thereto by means of conductor 16. By proper selection of the resistance 11 with relation to the photocurrent flowing therethrough, a potential differential sufficient to break down lamp 14 can be obtained between points A and B at the desired ambient light level whereby a current will flow between the cathodes 15a and 15b of lamp 14. When lamp 14 breaks down, a sudden drop in the potential existing thereacross occurs and, a current will flow from cathode 15a to cathode 15b through conductor 24, operating coil 23 of the relay 4, conductors 22, 19, the condenser 17, conductors 18 and 16 to point A as point A is positive with respect to point B. Once such a current flow is initiated, condenser 17 will discharge in order to sustain such current flow so that there is a current flow from the high potential side of condenser 17 through conductors 18 and 16, across the cathodes 15a and 15b of lamp 14, through conductor 24, through the coil 23 of relay 4 through the conductors 22 and 19, to the low potential side of condenser 17. As can be appreciated, relay 4 has a certain inertia which tends to resist movement of its armature 25 and, accordingly, condenser 17 must have sufficient capacity to provide a current flow for a sufficient period of time in order to obtain operation of the relay 4. When condenser 17 is so designed, the above described current flow through coil 23 of relay 4 attracts the armature 25 thereof so that the moving contact 28 electrically bridges the contacts 4b and the moving contact 27 disengages and electrically separates contacts 4a.

When stationary contacts 4b are bridged by the moving contact 28, a holding circuit for coil 23 of relay 4 is established from the conductor 1, through conductor 29, across the bridged contacts 4b, to conductors 30 and 24, through the coil 23 of relay 4, to the conductors 22 and 19, through the resistance 20 and conductor 21 to the conductor 2. Obviously, as the holding circuit is energized from conductor 1, conductor 29 must be connected to conductor 1 ahead of the contacts 4a so that the conductor 29 is not deenergized by the opening of contacts 4a.

Once the holding circuit for coil 23 is so established, the cathode 15b of lamp 14 is directly connected to conductor 1, by means of conductors 24 and 30, bridged contacts 4b and conductor 29, so that cathode 15b has the same potential as conductor 1. Cathode 15a of lamp 14 is still connected to point A, as indicated, whereby lamp 14 is connected in parallel with the photocell 7. As nighttime approaches the current flow through the photocell 7 gradually decreases due to the decrease in the light intensity upon the cathode 9 thereof. Accordingly, the current flow and voltage drop across resistance 11 also gradually decreases and in turn the potential at point A, and the cathode 15a of the lamp 14 directly connected thereto, becomes gradually less positive with respect to conductor 2 in the reverse of the manner previously indicated. Since the applied line voltage across conductors 1 and 2 is divided at all times between the resistance 11 and photocell 7, as the voltage drop across resistance 11 gradually decreases, the voltage across the photocell 7 gradually increases. As lamp 14 is connected across photocell 7, the voltage thereacross will, in turn, build up as the voltage across photocell 7 builds up; however, such potential will be of opposite polarity to that indicated in the previous operation of the circuit as the previously negative cathode 15b of lamp 14 is now directly connected to the positive conductor 1. When the reverse potential across lamp 14 is sufficient to cause breakdown of lamp 14, a discharge current will flow therethrough in the reverse direction from that of the previously described discharge current pulse so as to oppose the holding current flowing through coil 23. Under these conditions current will flow from cathode 15b to cathode 15a of the lamp 14, through conductors 16 and 18, across condenser 17, through conductors 19 and 22, the operating coil 23 of the relay 4, through conductor 24 to the cathode 15b. When such reverse current pulse has a value so that the net current flowing through coil 23 is insufficient to keep coil 23 energized, the armature 25 of relay 4 will drop whereby the movable contact 27 will again bridge the stationary contacts 4a and the movable contact 28 will move out of engagement with contacts 4b, and the system will be returned to the initially described nighttime condition.

It will particularly be noted that the coil 23 is energized across the source in order to disconnect the load L from the electrical source. Thus, should a circuit failure occur in the conductors 29, 30, 24, 22, 19, 21, resistance 20 or coil 23 of the relay 4, the holding circuit would be opened, coil 23 deenergized and the contacts 4b would be opened and contacts 4a closed. Thus, failure of these various components would cause the energization of the load L. Further, as the reverse discharge current pulse is dependent upon the voltage across the photocell 7, as the photocell 7 deteriorates it will be operative to turn on but not turn off the load L. Thus, if the photocell 7 fails, the load L will also be energized.

It is also possible that the condenser 17 could deteriorate to a condition so as to be inoperative; however, it will be noted that the current for energizing relay 4, in order to disconnect the load from the source as daylight approaches, and the current for overcoming the holding current of coil 23, as nighttime approaches, must flow through condenser 17. As is well known, a greater amount of energy is needed to close a deenergized relay than is required to hold a relay closed. Thus, when the capacity of condenser 17 is gradually reduced, the magnitude of current passing therethrough will be insufficient to energize the relay and disconnect the load from the source before becoming insufficient to overcome the holding current and connect the load to the source. As has also been described, the potential of point A is varied whereby the potential across lamp 14 is also varied. Thus, the breakdown voltage of lamp 14 should be slightly greater than one-half of the applied supply voltage as a breakdown voltage less than one-half the applied supply voltage might cause the circuit to "hunt" continuously between the two stages at certain light levels. A breakdown voltage much greater than one-half of the applied supply voltage causes a circuit to be energized and deenergized at widely different levels of illumination, which range is undesirable.

It is also desirable that such a circuit incorporates an automatic time delay so that it is not susceptible of false operation due to auto headlights, lightning strokes or other stray light of high intensity for short periods. Such purpose is accomplished by designing condenser 17 and resistance 20 so that their time constant is such that a sudden burst of current flow through the photocell 7 is limited by the resistance 20 to a value which is insufficient to increase the voltage across the condenser 17 to a point where lamp 14 will break down during a reasonable length of exposure. A time constant of one second has been found to be sufficient for such sudden high intensity light conditions.

Another feature of our invention resides in the fact that the circuit as described is "self-setting." Thus, for example, in the event that during the daytime the power supply to conductors 1 and 2 is interrupted, the holding circuit previously indicated would be interrupted, whereby the coil 23 of relay 4 would be deenergized and the load L connected to the source. Upon restoration of power, the unit would be operative to disconnect the load from the source, as indicated, under the conditions when daylight approaches. Similarly, if the power were interrupted during nighttime conditions, no change would occur in the circuit as the relay 4 is already deenergized and the load is connected to the source of power. It will also be noted that if the voltage of the supply source connected to conductors 1 and 2 is greater than twice the breakdown voltage of lamp 14, a resistance 100 may be connected in series with the conductor 30 which is of a suitable size so as to have a potential drop thereacross which is effective to reduce the line potential below a value to cause hunting of the circuit.

Figure 4:
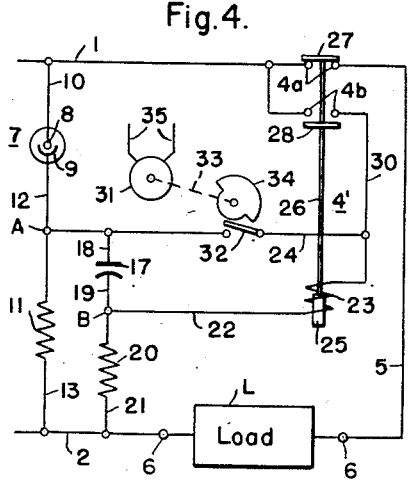
Fig. 4 is a circuit diagram of the embodiment of my invention shown in Fig. 2, which employs timing means for energizing a load-controlling relay.

Referring to Fig. 4, it will be noted that another embodiment of my invention shown therein is substantially identical to that shown in Fig. 2, and, accordingly, like parts have been given the same reference numerals. The embodiment shown in Fig. 4 differs from Fig. 2, in that an operating mechanism 31 is utilized to control a switch 32 which is located in the same place in the circuit as the neon lamp 14 previously described. The operating mechanism 31 may be of any suitable type, such as a clock-operated type connected to a source of suitable electrical energy 35 and which has an output shaft 33 for driving a cam 34 mounted at its end thereof which can cause switch 32 to close. Inasmuch as the construction of such timing mechanisms and cam mechanisms for operating switches are well known in the art and may take various forms and shapes, it is not believed necessary to more particularly describe the operation of such a mechanism. The switch 32 may be of any suitable type which is biased open and which is operable, depending upon the type of operating mechanism 31 employed, so as to be closed by the operating mechanism. As shown, switch 32 is of a type which is adapted to be operated by the rotatable cam 34. With such a circuit, it will be obvious that the function of all components of the circuit is identical except that, inasmuch as it is not necessary to ionize the lamp 14 to obtain a discharge thereacross, a lower value of photocurrent may be utilized for operating the system. Further, a less sensitive relay 4 may be employed as there is no impedance to limit the relay current. Also, as no lamp 14 is employed, the condenser 17 need only be designed with reference to the energy requirements of the relay 4.

Figure 3:
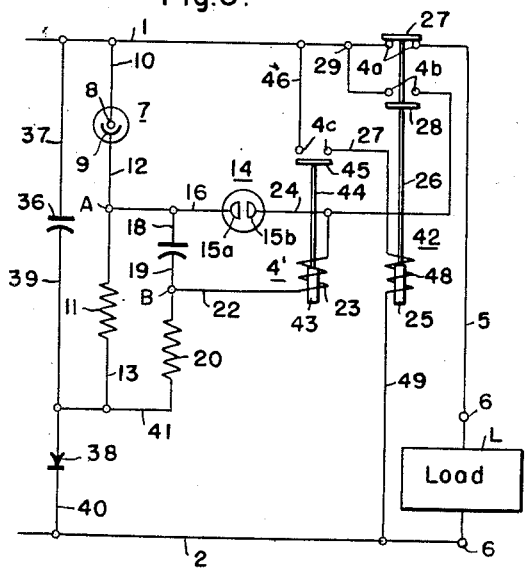
Fig. 3 is a circuit diagram of another embodiment of my invention which employs one relay for controlling the energization of a load-controlling relay.

The modification of my invention shown in Fig. 3 is similar to that shown in Fig. 2 and, accordingly, like parts have again been given like reference numerals. Primarily, it will be noted that this modification is adapted to be energized from an alternating current source of electrical energy connected to the conductors 1 and 2 as is more commonly found in street lighting circuits. It should be noted, however, that such modification can be suitably operated from a direct current source. In this modification such direct current is provided by electrically connecting one side of a condenser 36 to the conductor 1 by means of a suitable electrical conductor 37, and by connecting the other side thereof to one side of a half-wave rectifier 38 by means of a suitable electrical conductor 39. The other side of rectifier 38 is connected to the conductor 2 by means of a suitable electrical conductor 40. The resistances 20 and 11 of the control circuit which were previously connected to the conductor 2 are connected to the conductor 39 by means of a suitable electrical conductor 41.

Another modification of the control circuit shown in Fig. 3 is in the use of an auxiliary relay 4' to control the energization of a load control relay 42. It will be noted that relay 4' is provided with the operating coil 23 which is electrically connected in the control circuit, as previously described, so that relay 4' operates in the same manner as the relay 4 previously described. Relay 4' does not control the load L, as does the relay 4 previously described, but is provided with an armature 43 having an arm 44 which carries a movable bridging contact 45, which is adapted to engage a spaced pair of stationary contacts 4c similar to contacts 4a and 4b previously described. One of the contacts 4c is electrically connected to the conductor 1 by means of a suitable electrical conductor 46, and the other is electrically connected by means of a suitable electrical conductor 47 to one side of the operating coil 48 of the relay 42. The other side of the operating coil 48 is electrically connected by means of a suitable electrical conductor 49 to the conductor 2. Thus, energization of coil 23, as previously described, causes the core 43 to move so that the bridging contact 45 engages the spaced contacts 4c, whereby the operating coil 48 of relay 42 is electrically energized from conductor 1 through the conductor 46, bridged contacts 4c, conductor 47, coil 48, conductor 49, to the conductor 2.

It will be noted that relay 42 is provided with the armature 25, arm 26, and the bridging contacts 27 and 28 of the relay 4, as previously described, so that the operation of relay 42 upon energization of its coil 48 is similar to the operation of the relay 4, as previously described. Thus, relay 4' is energized in the same manner as relay 4; however, relay 4' controls only the energization of relay 42, which relay, in turn, controls the load L in the same manner as relay 4, as previously described. Inasmuch as one of the contacts 4c is electrically connected to the conductor 1 by means of a conductor 46, it is necessary that such connection be made ahead of the contacts 4a, in order to insure that one of the contacts 4c is electrically energized at all times. When the coil 48 of relay 42 is energized as described, the bridging contact 28 establishes a holding circuit for the operating coil 23 of relay 4', similar to that previously described. However, the holding current flows from the resistance 20 to the conductors 21, 41, and 39 through the rectifier 38 and then the conductor 40 to the conductor 2, rather than flowing directly through the resistance 20, conductor 21 and then to the conductor 2.

As before, however, as nighttime approaches and the reverse voltage across lamp 14 builds up to a point where a reverse current flows through the operating coil 23, the holding current for the coil 23 will be overcome and the bridging contact 45 disengages the stationary contacts 4c which, in turn, deenergizes the operating coil 48 of the relay 42, so that the holding circuit is broken and the contacts 4a are bridged, whereby the load L is directly connected to the conductors 1 and 2.

By this modification, it will be noted that the bridging contact 27 of relay 42 bridges the contacts 4a when deenergized, so that upon failure of the relay 42 to operate, the load L will be energized. Further, the splitting of the functions of relay 4 is not intrinsically related to the use of rectifier 38, and each modification may be used independently of the other.

In actual practice, such a circuit has been found to give satisfactory operation when utilizing a standard 929 photocell, in conjunction with a 150 megohm resistance 11 for operation in the 2.5 to 5 footcandle range of illumination. Such circuit also included a standard NE-2 or NE-48 neon lamp and a standard sensitive relay of 5 to 10 milliwatt class for the relay 4'. The relay 42 was a standard relay capable of handling the load current required with a standard 117 v. street light for the load L. Also, such circuit employed a 1 to 2 microfarad high quality capacitor for the condenser 17 and a resistance of approximately 50,000 ohms for the resistance 20, and an 0.1 microfarad condenser 36. A standard selenium rectifier having a 65 milliampere rating was also employed. It is to be realized, that such values are purely illustrative of one particular set of values which have proven to give satisfactory operation of this modification of my invention. Such values should, however, be considered only as illustrative and should not be considered as limiting in any manner.

Figure 1:
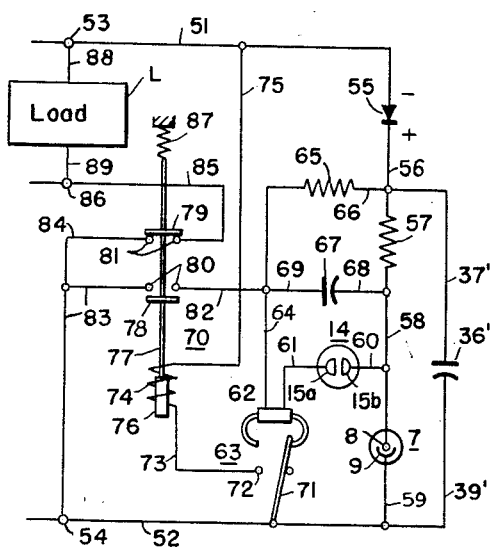
Figure 1 is a circuit diagram of one embodiment of my invention which employs a polar relay.

Another modification of my invention for use with an alternating current source of electrical energy is shown in Fig. 1. As shown, the alternating current source is adapted to be connected to a pair of spaced electrical conductors 51 and 52 which may be provided with suitable terminals 53 and 54, respectively, at one of their ends so that the electrical connections thereto may readily be made. The other end of conductor 51 is connected by any suitable means to one side of a half-wave rectifier 55, the other side of which is electrically connected by means of a suitable electrical conductor 56 to one side of the resistance 57. The other side of resistance 57 is electrically connected by means of a suitable electrical conductor 58 to the anode 8 of the photocell 7, as previously described. Cathode 9 of photocell 7 is electrically connected by means of a suitable electrical conductor 59 to the conductor 52. Thus, when the photocell 7 is conductive, as previously described, a current will flow from conductor 51 through the half-wave rectifier 55, through conductor 56, resistance 57, conductor 58, photocell 7, and conductor 59, to the conductor 52.

As before, with reference to Fig. 3, a filter condenser 36' is electrically connected across the photocell 7 and resistance 57 by means of suitable electrical conductors 37' and 39' which are connected to the conductors 56 and 59, respectively. Also, as before, in order to provide a triggering device, a neon lamp 14, as previously described, has one of its cathodes 15b electrically connected by means of a suitable electrical conductor 60 to the conductor 58, and its other cathode 15a electrically connected by means of a suitable electrical conductor 61 to one side of an operating coil 62 of a polar relay 63. The other side of the operating coil 62 is electrically connected by means of a suitable electrical conductor 64 to one side of a resistance 65, the other side of which is electrically connected by means of a suitable electrical conductor 66 to the conductor 56. A condenser 67 has one of its sides electrically connected to the conductor 58 by means of a suitable electrical conductor 68 and its other side connected to the conductor 64 by means of a suitable electrical conductor 69.

Relay 63 is similar in function to the relay 4', previously described, in that it is an auxiliary relay for controlling a light contact relay 70. As shown, relay 63 is provided with a movable contact 71 which is electrically connected to the conductor 52, and a stationary contact 72 which is electrically connected to one side of an operating coil 74 of the relay 70 by means of a suitable electrical conductor 73. Inasmuch as such polar relays 63 are well known in the art, it is not believed necessary to more particularly describe their construction or operation, however, it should be borne in mind that such relays cause the movable contact 71 to move in one direction in response to current flow through the operating coil 62 in one direction, and in order to reverse the direction of movement of the moving contact 71, it is necessary that the current flow through the operating coil 62 be reversed.

As the other side of operating coil 74 is electrically connected to the conductor 51 by means of a suitable electrical conductor 75, it will be noted that when the moving contact 71 of the polar relay 63 is in engagement with the stationary contact 72 thereof, the operating coil 74 of relay 70 is energized from the conductor 51 through the conductor 75, operating coil 74, conductor 73, stationary contact 72, movable contact 71, to the conductor 52. Conversely, the operating coil 74 of relay 70 is deenergized when the movable contact 71 of relay 63 is not in engagement with the stationary contact 72 thereof. Consequently, the energization of relay 70 is dependent upon the position of the movable contact 71 of the relay 63, that is, the operation of the relay 63. Relay 70 is provided with an armature 76 to which is secured an arm 77 which carries a pair of spaced movable contacts 78 and 79 for the purpose of bridging a pair of stationary contacts 80 and 81, respectively. One contact 80 is electrically connected to the conductor 64 by means of a suitable electrical conductor 82, and the other contact 80 is connected to the conductor 52 by means of a suitable electrical conductor 83. One contact 81 is connected to the conductor 83 by means of a suitable electrical conductor 84, while the other contact 81 is connected by means of a suitable electrical conductor 85 to an electrical terminal 86. As shown, the load L is electrically connected between the terminals 53 and 86 by means of electrical conductors 88 and 89 connected thereto, respectively. Thus, it will be noted that one side of the load is constantly energized from the alternating current source. Further, it will be noted that the armature 76 and arm 77 of relay 70 are biased downwardly at all times by any suitable means, such as a spring 87 engaging the arm 77, whereby the normal or unenergized position of relay 70 is such that the bridging contact 79 electrically connects the spaced contacts 81. Thus, it will also be noted that bridging contacts 79 and 78 are similar to bridging contacts 27 and 28, previously described, in that when either one is in engagement with its respective contacts, the other is out of engagement with its respective contacts. The terminals 53, 54, and 86 to which electrical connections may be made, may, if desired, be incorporated in an electrical plug, whereby the entire control circuit may merely be plugged into operative relationship with the source and the load L.

The circuit as shown in Fig. 1 is for nighttime conditions, in that the load L is connected across the source being directly connected to the terminal 53 by means of conductor 88 at one side and being connected by means of conductor 89, terminal 86, conductor 85, bridged contacts 81, conductors 84 and 83 to the conductor 52 and the terminal 54 on the other side. Under such nighttime conditions, the current flow through photocell 7 is very low. As the current flow through photocell 7 gradually increased due to the gradual increase in the level of illumination, the potential existing across the photocell 7 gradually decreases and the potential across the resistance 57 gradually increases. The voltage across the resistance 65 and condenser 67 is equal to the voltage across the resistance 57, as these elements are connected thereacross by means of conductors 66, 64, 69, and 68. As the potential across the resistance 57 increases, the value of the voltage across the lamp 14 may be made, as previously indicated, to increase until a point is reached whereby such voltage is equal to its breakdown voltage. As cathode 15a is at a higher potential than cathode 15b, when the value of the voltage across lamp 14 equals its breakdown voltage, current will flow from cathode 15a to cathode 15b. As before condenser 67 will attempt to maintain such current flow from the condenser 67 through conductors 69 and 64, operating coil 62 of relay 63, through conductor 61, across the spaced cathodes 15a and 15b of lamp 14, through conductors 60, 58, and 68, to the other side of the condenser 67. Relay 63 is designed so that the current flow in this direction causes the moving contact 71 of the polar relay 63 to move over into engagement with its stationary contact 72, whereby the operating coil 74 of relay 70 is energized, and the arm 77 of relay 70 is moved so that bridging contact 79 disengages the spaced contacts 81 and so that the bridging contact 78 electrically engages the spaced contacts 80. With such movement of the relay 70, load L is disconnected from the terminal 54. Cathode 15a of lamp 14 is also then connected to the cathode 9 of the photocell 7 by means of the conductor 61, coil 62 of relay 63, conductors 64 and 82, bridged contacts 80, conductors 83, 52, and 59. Thus, the lamp 14 will have a voltage thereacross equal to the voltage across the photocell 7 as the other side of lamp 14 is connected to the anode 8 of photocell 7 by means of conductors 58 and 60. As nighttime conditions approach, of course, it will be realized that as the excitation of cathode 9 decreases, the current flow between the cathode 9 and anode 8 of photocell 7 decreases, the potential thereacross will increase and, accordingly, the potential across the lamp 14 will increase. When the voltage across lamp 14 equals its breakdown voltage, a current will flow through lamp 14 and operating coil 62 of relay 63 in the opposite direction to that previously indicated as occurring at dawn, and, accordingly, will cause the movable contact 71 of polar relay 63 to move out of engagement with the stationary contact 72, whereby the holding circuit of the operating coil 74 of relay 70 is broken, and the load L once again is connected to the terminal 54 in the same manner as previously indicated. Similarly, the disengagement of the bridging contact 78 from the stationary contacts 80 causes the cathode 15a of lamp 14 to be disconnected from the cathode 9 of photocell 7 and again be connected so as to be positive with respect to the cathode 15b.

In one circuit which has been found to give satisfactory operation a selenium-type rectifier having a 65 milliampere rating and a 929 standard photocell was employed. A standard NE-54 neon lamp was used. The resistance 65 and resistance 57 had a value of 1 megohm and 150 megohms, respectively, while the condenser 67 and condenser 36' had a value of 1.0 microfarad and 0.5 microfarad, respectively. As before, it will be realized that such values are illustrative only of one operative circuit and should not be construed as limiting in any sense.

This control circuit is designed to control up to 1000 watts load and as it does not employ any hot cathode type of tubes the maintenance cost may be substantially reduced over control circuits which have such tubes. The circuit is also inherently anti-hunting, and also incorporates an automatic time delay as previously discussed. As before, failure of various components in the circuit causes the load to be connected across the supply line. Further, as the contact 71 of relay 63 is directly connected to one side of the source a minimum of contacts may be employed for controlling the energization of the load.

Accordingly, having described the preferred embodiments of my invention in accordance with the Patent Statutes, it is desired that my invention be not limited to the specific constructions illustrated, inasmuch as it will be apparent to those skilled in the art that many modifications thereof may be made without departing from the broad spirit and scope of my invention. Accordingly, it is desired that my invention be interpreted as broadly as possible and that it be limited only as required by the prior art.

I claim as my invention:

1. A control circuit comprising a pair of spaced electrical conductors which are adapted to be electrically connected to a source of electrical energy, a first circuit connected across said pair of electrical conductors comprising a light sensitive cell electrically connected in series with a first resistance, an auxiliary circuit including a condenser and a normally non-conductive portion, one side of said condenser and said normally non-conductive portion being electrically connected to said first circuit between said cell and said first resistance, the other side of said condenser and said normally non-conductive portion being electrically connected together, switching means having normally open contacts therein connecting the joined other side of said condenser and said normally non-conductive portion to the electrical conductor to which said cell is directly connected, a second resistance electrically connected directly from said other side of said condenser to the conductor to which said first resistance is directly connected so that said condenser and said second resistance are in parallel with said first resistance, switch operating means in said auxiliary circuit which is operable to close said contacts when a sufficient current flows through said auxiliary circuit, and means for causing said normally non-conductive portion to conduct an electrical current in either direction.

2. A control circuit comprising a pair of spaced electrical conductors which are adapted to be electrically connected to a source of electrical energy, a first circuit connected across said pair of electrical conductors comprising a light sensitive cell electrically connected in series with a first resistance, an auxiliary circuit comprising a condenser, a relay coil and a normally non-conductive portion, one side of said condenser and said normally non-conductive portion being electrically connected to said first circuit between said cell and said first resistance, the other side of said condenser and said normally non-conductive portion being electrically connected to opposite ends of said relay coil, respectively, a second resistance electrically connected from said other side of said condenser to the electrical conductor to which said first resistance is directly connected so that said condenser and said second resistance are in parallel with said first resistance, switching means having normally open contacts therein connecting said other side of said normally non-conductive portion to the electrical conductor to which said cell is directly connected, said relay coil having a movable element for closing said contacts in response to a sufficient current flow through said relay coil, and means for causing said normally non-conductive portion to conduct an electrical current.

3. A control circuit comprising a pair of separate electrical conductors which are adapted to be electrically connected to a source of electrical energy, a first circuit connected across said electrical conductors comprising a light sensitive cell electrically connected in series with a first resistance, an auxiliary circuit including a condenser and a gaseous discharge device capable of breakdown in opposite directions, one side of said condenser and said discharge device being electrically connected to said first circuit between said cell and said first resistance, the other side of said condenser and said discharge device being electrically connected together, a second resistance electrically connected from said other side of said condenser to the electrical conductors to which said first resistance is directly connected so that said condenser and said second resistance are in parallel with said first resistance, said discharge device being conductive in response to a predetermined voltage applied thereto whereby current will flow through said auxiliary circuit, switch operating means energizable by said current flow in said auxiliary circuit, switching means having normally open contacts therein connecting said other side of said discharge device to the electrical conductor to which said cell is directly connected, and said switching means being operable upon energization of said switch operating means to close said contacts.

4. A control circuit comprising a pair of separate electrical conductors having input and output terminals, a first circuit connected across said conductors comprising a light sensitive cell electrically connected in series with a first resistance, a control means having one side thereof electrically connected to said first circuit between said cell and said first resistance, a second resistance electrically connected from the other side of said control means to the one of said conductors to which said first resistance is directly connected so that said second resistance and at least a portion of said control means are connected in parallel with said first resistance, said control means being responsive to current flow through said first circuit for causing a current flow therethrough, switching means for normally connecting said input terminals to said output terminals, and said switching means having means responsive to current flow through said control means whereby said input terminals are disconnected from said output terminals.

5. A control circuit comprising a pair of separate electrical conductors having input and output terminals, a first circuit connected across said conductors comprising a light sensitive cell electrically connected in series with a first resistance, a control means having one side thereof electrically connected to said first circuit between said cell and said first resistance, a second resistance electrically connected from the other side of said control means to the one of said conductors to which said first resistance is directly connected so that said second resistance and at least a portion of said control means are connected in parallel with said first resistance, said control means being responsive to current flow through said first circuit for causing a current flow therethrough, switching means including means responsive to current flow through said control means for connecting said input terminals to said output terminals when said current responsive means is deenergized, said current responsive means being energizable by said current flow through said control means for causing said switching means to disconnect said input terminals from said output terminals and said switching means including means to connect the junction point between said second resistance and said control means to the other of said conductors so that a holding current for energizing said current responsive means flows therethrough whereby said input terminals remain disconnected from said output terminals.

6. A control circuit comprising a pair of separate electrical conductors which are adapted to be electrically connected to a source of electrical energy, a first circuit connected across said conductors comprising a light sensitive cell electrically connected in series with a first resistance, a relay having a coil, an auxiliary circuit including a gaseous discharge device capable of breakdown in opposite directions and said relay coil each having one side thereof electrically connected together, said discharge device having its other side electrically connected to said first circuit between said cell and said first resistance, a second resistance electrically connected from the other side of said relay coil to the one of said conductors to which said first resistance is directly connected so that said second resistance, said relay coil and said discharge device are connected in parallel with said first resistance, said discharge device being responsive to a predetermined voltage applied thereto to cause an energizing current to flow through said relay coil, and said relay also having means for connecting a junction point between said relay coil and said discharge device to the other of said conductors when said relay coil is so energized so that a holding current flows through said relay coil.

7. A control circuit comprising a pair of separate electrical conductors having input and output terminals, a first circuit connected across said conductors comprising a light sensitive cell electrically connected in series with a first resistance, a first and second relay having a first and second coil respectively, an auxiliary circuit comprising a condenser having one side electrically connected to a gaseous discharge device capable of breakdown in opposite directions and said first coil having opposite ends electrically connected to the other side of said condenser and said discharge device, said auxiliary circuit having a point between said condenser and said discharge device electrically connected to said first circuit between said cell and said first resistance, a second resistance electrically connected to said auxiliary circuit between said condenser and said first coil to the one of said conductors to which said first resistance is directly connected so that said second resistance and said condenser are connected in parallel with said first resistance, said discharge device being responsive to a predetermined voltage applied thereto for causing a current flow in said auxiliary circuit through said first coil, said first relay having means responsive to said current flow in said first coil for controlling the energization of said second coil, and said second relay having means for selectively connecting said input terminals and said output terminals depending upon the energization of said second coil.

8. A control circuit comprising a pair of spaced electrical conductors having input and output terminals, a light sensitive cell and a first resistance connected in series across said conductors, a condenser electrically connected in series with a charging resistance which is connected in parallel with said first resistance so that when said cell is conductive said condenser will become charged, an electrical winding connected in series with a gaseous breakdown discharge device capable of breakdown in opposite directions which is connected in parallel with said condenser, said discharge device being operative in response to a predetermined voltage applied thereto to cause a current flow through said winding, a first switching means responsive to said current flow through said winding for connecting an operating coil across said conductors, a second switching means responsive to energization of said coil having a first element for disconnecting said input terminals from said output terminals and a second element for connecting a junction point between said winding and said discharging means to the one of said conductors to which said cell is directly connected whereby said winding and said charging resistance are connected across said conductors and said discharge device is connected across said cell, said discharge device being responsive to the potential across said cell when said junction point is so connected so as to cause a current flow through said winding to deenergize said winding whereby said coil is deenergized, and said first element of said second switching means being responsive to deenergization of said coil to connect said input terminals to said output terminals, and said second element of said second switching means being responsive to deenergization of said coil to disconnect said junction point from said one of said conductors.

9. A control circuit comprising a pair of spaced electrical conductors having input and output terminals, a light sensitive cell and a first resistance connected in series across said electrical conductors, a condenser electrically connected in series with a charging resistance which is connected in parallel with said first resistance so that when said cell is conductive said condenser will become charged, a polar relay having an operating winding connected in series with a gaseous breakdown discharge device capable of breakdown in opposite directions which is connected in parallel with said condenser, said discharge device having a voltage applied thereto in response to current flow in said first circuit which when efficient causes a current flow through said winding in one direction, said polar relay having a first switching means responsive to said current flow through said winding for energizing a second switching means having a first element for disconnecting at least one of said input terminals from said output terminals and having a second element for connecting a junction point between said winding and said charging resistance directly to the electrical conductor to which said cell is directly connected whereby said discharge device is connected in series with said winding across said cell, said discharge means being responsive to the potential across said cell when said junction point is so connected which when efficient causes a current flow through said winding in a direction the reverse of said one current flow, and said first switching means being responsive to said reverse current flow to deenergize said second switching means so that said first element connects said input terminals to said output terminals and said second element of said second switching means disconnects said junction point from said electrical conductor to which said cell is directly connected.

10. A control circuit comprising a pair of spaced electrical conductors which are adapted to be electrically connected to a source of electrical energy, a first circuit connected across said pair of electrical conductors comprising a light sensitive means having an impedance the value of which is dependent upon the light intensity adjacent thereto connected in series with a first resistance, an auxiliary circuit including a condenser and a normally non-conductive portion, one side of said condenser and said normally non-conductive portion being electrically connected to said first circuit between said sensitive means and said first resistance, the other side of said condenser and said normally non-conductive portion being electrically connected together, switching means having normally open contacts connecting the joined other side of said condenser and said normally non-conductive portion to the electrical conductor to which said sensitive means is directly connected, a second resistance electrically connected directly from said other side of said condenser to the conductor to which said first resistance is directly connected so that said condenser and said second resistance are in parallel with said first resistance, switch operating means responsive to predetermined current flow in said auxiliary circuit to close said contacts when a sufficient current flows through said auxiliary circuit, and means for causing said normally non-conductive portion to conduct an electrical current in opposite directions.

11. A lighting control comprising, a pair of supply conductors, a pair of impedances connected in series across said supply conductors with one of said impedances being variable in response to the intensity of light incident thereon, switching means for opening and closing a load circuit, a series control circuit including operating means for switching means, control means for rendering said series circuit conducting or non-conducting, a third impedance, said third impedance also being connected across the other of said first two mentioned impedances so that a current will flow in said series circuit to operate said switching means when said control means renders the series circuit conducting and said variable impedance has a low value, and a second switching means operated by said switch operating means to connect said third impedance across said supply conductors to cause a current to flow in said series circuit when said control means renders it conducting and said variable impedance has a high value.

References Cited in the file of this patent

UNITED STATES PATENTS

| 2,037,925 | Rentschler | Apr. 21, 1936 |
| 2,096,916 | Pook | Oct. 26, 1937 |

FOREIGN PATENTS

| 332,616 | Italy | Dec. 3, 1935 |
| 56,246 | Norway | Mar. 2, 1936 |

OTHER REFERENCES

"Electronic Industries," July 1944, pp. 98–100.